United States Patent [19]

Saxton et al.

[11] Patent Number: 5,688,484

[45] Date of Patent: Nov. 18, 1997

[54] NON-HYDROTHERMAL METHOD OF MAKING A TITANIUM-CONTAINING ZEOLITE

[75] Inventors: Robert J. Saxton, West Chester; John G. Zajacek, Devon, both of Pa.

[73] Assignee: ARCO Chemical Technology, L.P., Greenville, Del.

[21] Appl. No.: 681,585

[22] Filed: Jul. 29, 1996

[51] Int. Cl.$^6$ ..................... C01B 33/34
[52] U.S. Cl. .......... 423/700; 423/701; 423/702; 423/704; 423/705; 423/709; 423/714; 423/328.2; 423/DIG. 22
[58] Field of Search ............ 423/700, 701, 423/702, 704, 705, 709, 714, DIG. 22, 328.2

[56] References Cited

U.S. PATENT DOCUMENTS

| | | | |
|---|---|---|---|
| 4,410,501 | 10/1983 | Taramasso et al. | 423/326 |
| 4,666,692 | 5/1987 | Taramasso et al. | 423/326 |
| 5,064,629 | 11/1991 | Asaoka | 423/279 |
| 5,098,684 | 3/1992 | Kresge et al. | 423/277 |
| 5,198,203 | 3/1993 | Kresge et al. | 423/718 |
| 5,246,690 | 9/1993 | Bellussi et al. | 423/705 |
| 5,320,822 | 6/1994 | Ozin et al. | 423/700 |

FOREIGN PATENT DOCUMENTS

| | | |
|---|---|---|
| 2694549 | 2/1994 | France . |
| 2037596 | 6/1993 | Spain . |
| 91/18833 | 12/1991 | WIPO . |
| 93/02013 | 2/1993 | WIPO . |
| 94/29022 | 12/1994 | WIPO . |
| 9614269 | 5/1996 | WIPO . |

OTHER PUBLICATIONS

M.A. Camblor et al., Synthesis of a Titaniumsilicoaluminate Isomorph to Zeolite Beta and Its Application as a Catalyst for the Selective Oxidation of Large Molecules, J. Chem. Soc. pp. 589–590.No month 1992.

A. Thangaraj et al., Catalytic Properties of Crystalline Ti Silicalites, J. of Catalysis 130, pp. 1–8. No. month 1991.

C.B. Dartt et al., Synthesis and Physiochemical Properties of Zeolites Containing Framework Ti, Symposium on Chemically Modified Molecular Sieves, 206th National Meeting, A. Chem. Soc. pp. 491–493 Aug. 22, 1993.

B. Kraushaar et al., A New Method for the Preparation of Ti–Silicalite (TS–1), Catalysis Lett., 1, pp. 85–92. No month 1988.

S.Nadimi, Ph.D. Thesis, University of Toronto, "Non–Aqueous Synthesis of Zeolites and Molecular Sieves" (1993).

Primary Examiner—Mark L. Bell
Assistant Examiner—Louis M. Troilo
Attorney, Agent, or Firm—Stephen D. Harper

[57] ABSTRACT

A process for producing a titanium-containing zeolite such as TS-1 titanium silicalite is disclosed. A precursor mixture comprising a silica source such as tetraalkylorthosilicate, a titanium source such as titanium alkoxide, a growth medium comprising a nitrogen-containing organic base such as an amine, a fluoride-containing mineralizing agent such as hydrogen fluoride, and an optional organic solvent, is formed then heated to yield the titanium-containing zeolite as solid crystals. A controlled amount of water may be present in the growth medium. The process is capable of providing good yields of high purity zeolites containing framework titanium atoms even in the absence of a quaternary ammonium salt.

22 Claims, No Drawings

NON-HYDROTHERMAL METHOD OF MAKING A TITANIUM-CONTAINING ZEOLITE

FIELD OF THE INVENTION

This invention pertains to methods for synthesizing titanium-containing zeolites. In particular, the invention relates to the synthesis of zeolites such as titanium silicalites in the absence of quaternary ammonium salt using a growth medium comprised of a nitrogen-containing organic base and a fluoride-containing mineralizing agent.

BACKGROUND OF THE INVENTION

In recent years, the preparation of crystalline molecular sieves containing framework titanium atoms has received considerable attention due to the fact that such materials are active catalysts for the oxidation of organic substrates. For example, TS-1 titanium silicalite was reported in U.S. Pat. No. 4,833,260 to be a useful catalyst for olefin epoxidation using hydrogen peroxide. To date, however, synthetic methods for the preparation of high purity titanium silicalite have essentially been limited to hydrothermal procedures performed in aqueous media using a quaternary ammonium species as a template or structure directing agent (see, for example, the procedures described in U.S. Pat. No. 4,410, 501).

The synthesis of titanium-containing zeolites by hydrothermal methods has certain disadvantages. Formation of the crystalline products typically takes place under highly metastable conditions defined by a large number of variables. It is not uncommon for mixed crystalline phases to be generated, thereby degrading the purity of the product obtained. Additionally, if the synthesis is carried out in an aqueous environment using hydroxide as the mineralizing agent only a pH in the basic range can be utilized. This restricts the types of reagents employable as sources of silica and titania in the desired zeolite. The development of alternative methods for making zeolites containing framework titanium atoms thus would be highly desirable.

U.S. Pat. No. 5,320,822 (Ozin et al.) teaches that certain types of crystalline microporous solids (silica molecular sieves and aluminosilicate zeolites) may be grown in a fluoride-containing, substantially non-aqueous medium to form crystals approximately 0.3 to 3 mm in size. Unfortunately, the methods described in said patent cannot necessarily be used to make any of the numerous different types of molecular sieves known to exist. For instance, aluminosilicates having an MFI (ZSM-5) structure cannot be obtained by such methods. One of the inventors named in the patent states on page 78 of her 1993 doctoral thesis that various attempts to synthesize ZSM-5 (i.e., to incorporate aluminum within a silicalite-1 framework) using the patent methods were unsuccessful. This lack of success was ascribed to disruption of the ZSM-5 crystallization process by the heteroatom aluminum. As observed recently by Tuel et al. [*J. Chem. Soc., Chem. Commun.* 1667–1668 (1994)], the synthesis of Ti-containing molecular sieves is relatively difficult. It is therefore highly uncertain whether the synthetic procedures described in U.S. Pat. No. 5,320,822 could successfully be modified to enable the production of titanium silicalite (a titanium-containing molecular sieve having an MFI structure).

SUMMARY OF THE INVENTION

The present invention provides a method of making a titanium-containing zeolite. Said method comprises the step of preparing a precursor mixture comprised of a silica source, a titania source, a growth medium comprising a nitrogen-containing organic base, a fluoride-containing mineralizing agent, and, optionally, an organic solvent which does not inhibit mineralization of the silica source and the titania source. A quaternary ammonium salt and water may also be present, but are not necessary. Said method further comprises the step of heating said precursor mixture for a time and at a temperature sufficient to produce the titanium-containing zeolite, which is obtained in the form of solid crystals.

The methods described herein are useful for the preparation of crystalline microporous solids possessing defined and ordered crystalline framework structures within which there are regular arrays of cavities, channels or pores. Such materials are commonly referred to as zeolites or molecular sieves. The framework comprises silicon and titanium atoms ("T" atoms) with oxygen atoms bridging between the "T" atoms. The "T" atoms typically possess four-fold coordination of tetrahedral or distorted tetrahedral symmetry. Other elements such as Al, B, Fe and the like may be present in the framework in minor amounts; preferably, however, only Si, Ti, and O are present. The present invention is particularly suitable for the synthesis of titanium silicalites, particularly TS-1 titanium silicalite.

DETAILED DESCRIPTION OF THE INVENTION

Any source of silica may be used in the process of this invention provided that said source is capable of being mineralized in the growth medium. The silica source may be soluble in the growth medium, but silica sources insoluble in the growth medium may also be employed. Suitable non-limiting silica sources include tetraalkyl orthosilicates, silica sols, silica gels, fumed silicas, silicic acid, amorphous silicas, and the like. Preferred are tetraalkyl orthosilicates such as, for example, tetraethyl orthosilicate. At least a portion of the Si present in the silica source is incorporated as tetrahedral silica in the framework of the titanium-containing zeolite generated.

Similarly, any source of titania is acceptable for use in the present process provided it is capable of being mineralized in the growth medium. The titania source may be soluble in the growth medium, but silica sources insoluble in the growth medium may also be utilized. Suitable non-limiting titania sources include titanium alkoxides, titanium halides, titanium hydroxides, titanium oxides, and the like. Preferred are titanium alkoxides, such as titanium tetra-n-butoxide and titanium tetraethoxide, for example. The Ti present in the titania source is incorporated in the framework of the titanium-containing zeolite formed, predominately in tetrahedral form.

Also contemplated in the present invention is the use of a single material which functions simultaneously as the silica source and titania source. Co-gels, co-precipitates, mixed oxides, and xerogels of silica and titania may be utilized, for instance. Also suitable for use are copolymers of silicon and titanium containing organic substituents such as, for example, condensates of titanium alkoxides and tetraalkylorthosilicates wherein multiple titanium and silicon atoms are linked together by oxygen atoms in a polymeric chain with alkoxide groups substituted on titanium and silicon. The relative proportions of silica source and titania source used may vary widely, but preferably are selected such that the molar ratio of Si to Ti is in the range of from 4:1 to 50:1.

The growth medium which characterizes the process of this invention is a medium comprising, at a minimum, a nitrogen-containing organic base and a fluoride-containing mineralizing agent. The growth medium may also contain water or an equivalent or precursor thereof. The presence of water is desirable where certain silica and titania sources are employed, such as, for example, sources requiring some degree of hydrolysis in order to form $SiO_2$ and $TiO_2$ framework units. In one embodiment of the invention, an amount of water is utilized such that the molar ratio of water to combined moles of Ti and Si is no greater than 10 (i.e., from 0:1 to 10:1 ) and such that the ratio of moles of water to combined moles of nitrogen-containing organic base and optional organic solvent is no greater than 1 (i.e., from 0:1 to 1:1). In another embodiment of the invention, the molar ratio of water to (Ti+Si) is at least 1 (i.e., from 1:1 to 10:1). Larger amounts of water could also be employed if so desired (for instance, up to a water:(Ti+Si) molar ratio of 100:1). Preferably, the weight ratio of water to the combined amount of nitrogen-containing organic base and optional organic solvent does not exceed 1:1.

Suitable nitrogen-containing organic bases are those substances capable of at least partially solubilizing the silica source and titania source in the presence of the fluoride-containing mineralizing agent. The nitrogen-containing organic base should also be sufficiently basic to at least partially abstract protons from the water which may be present so as to produce hydroxide ions. It is desirable that the nitrogen-containing organic base be a liquid at the temperatures encountered during formation and heating of the mixture.

While the mechanism by which the nitrogen-containing organic base participates or assists in the formation of the titanium-containing zeolite is not known, it is possible that the nitrogen-containing organic base acts as both a structure-directing agent and pore-filler. This may enable the crystallization of zeolite structures such as TS-1 titanium silicalite which normally require the presence of a quaternary ammonium salt.

Illustrative nitrogen-containing organic bases suitable for use include alkyl amines, especially amines substituted with from 1 to 3 $C_1-C_{10}$ alkyl groups such as primary, secondary, and tertiary alkyl amines. Aromatic amines and amines containing both alkyl and aromatic groups may also be advantageously used, as can mixtures or blends of any of the foregoing types of nitrogen-containing organic bases. Specific examples of such materials include, but are not limited to, ethylamine, diethylamine, triethyl amine, n-propylamine, di-n-propylamine, tri-n-propylamine, isopropylamine, diisopropylamine, triisopropylamine, butylamines, dibutylamines, tributylamines, alicyclic-substituted amines (e.g., cyclohexylamine, cyclopentylamine), aniline, toluidine, and N, N'-dimethylformamide. N-heterocycles (i.e., cyclic compounds, both aliphatic and aromatic, having at least one ring nitrogen atom) such as pyridine, alkyl-substituted pyridines (including pyridines substituted with one or more $C_1-C_{10}$ alkyl groups), morpholine, quinuclidine, hexamethyleneimine, piperidine, pyrrolidine, and heptamethyleneimine are also suitable for use. In one desirable embodiment, the nitrogen-containing organic base is selected from pyridine, n-propylamine, hexamethyleneimine, and mixtures thereof. In another desirable embodiment, hexamethyleneimine is the sole nitrogen-containing organic base employed.

The concentration of fluoride-containing mineralizing agent in the growth medium is any concentration which is effective in producing the desired titanium-containing zeolite in solid crystalline form. Without wishing to be bound by theory, it is thought that the fluoride-containing mineralizing agent acts as a mineralizer or solubilizer which increases the solubility of the titania or silica source in the growth medium and which may also help to transport the silica or titania source to nucleation sites. While any mineralizing agent capable of serving as a source of fluoride ion may be utilized, it is particularly desirable to use hydrogen fluoride. The mineralizing agent may also be ammonium fluoride or ammonium bifluoride. Hydrogen fluoride may be readily handled in solution form by dissolving a desired amount of gaseous HF in the nitrogen-containing organic base being used. The hydrogen fluoride may be complexed with nitrogen-containing organic base. Aqueous hydrogen fluoride solutions could also be used so long as the quantity of water accompanying the HF does not result in the total amount of water exceeding the maximum permitted in accordance with this process.

The molar ratio of fluoride to the total combined amount of titanium and silicon (Ti+Si) is preferably in the range of from about 0.5 to about 5.

Optionally, the growth medium may contain an organic solvent in addition to the nitrogen-containing organic base. Such solvent is selected so that it does not block or inhibit the desired mineralization of the silica and titania sources or the crystallization of the titanium-containing zeolite product. The optional solvent may be either miscible or immiscible with the nitrogen-containing organic base and, like the base, is preferably liquid at the temperatures experienced during practice of the instant process. Ethers (e.g. tetrahydrofuran), glycols (e.g., diethylene glycol), sulfoxides (i.e. dimethyl sulfoxide), sulfones (e.g., sulfolane), hydrocarbons (e.g., mineral oil), alcohols (e.g., butanol) and the like, for example, could be used as the optional organic solvent.

The relative proportions of nitrogen-containing organic base and optional organic solvent employed may vary greatly, but typically it will be advantageous to maintain the ratio of (moles organic base and moles organic solvent) to (moles Ti and Si) between 5:1 to 30,000:1 (more preferably, between 5:1 to 100:1). The optional organic solvent may desirably be present in amounts ranging from 0 to 1000 percent by weight relative to the quantity of organic base used.

An important advantage of the present invention is that the presence of a quaternary ammonium salt in the growth medium is not needed to yield the desired titanium-containing zeolite. This finding was surprising in view of the fact that, according to Nadimi (Doctoral thesis, 1993, University of Toronto), the process described in U.S. Pat. No. 5,320,822 is incapable of producing silicalite-1 (i.e., an all-silica zeolite having an MFI or ZSM-5 structure) unless a quaternary ammonium salt is utilized. Additionally, methods known in the art for synthesizing TS-1 titanium silicalite in aqueous media invariably require the use of a quaternary ammonium salt.

However, if so desired, a quaternary ammonium salt can be present in the growth medium. Such materials are well-known in the zeolite art and include halide and hydroxide salts of nitrogen-containing compounds wherein the nitrogen atom is substituted with four organic groups such as alkyl, aryl, and the like.

Although this invention provides a means of growing crystals of titanium-containing zeolite in an environment where water is not being utilized as a solvent (as in conventional hydrothermal techniques), it is typically desirable to introduce a controlled quantity of water into the growth medium. The amount of water present preferably does exceed a reagent amount and may be low enough to be regarded as a catalytic amount. The molar ratio of water to the combined number of moles of titanium and silica, in one embodiment of this invention, is no greater than 10. By careful selection of the silica and titanium sources, it is also possible to practice the process of this invention in the substantial absence of water (i.e., where the molar ratio of water to Ti+Si is essentially 0). Where the silica source is a tetraalkyl orthosilicate and the titania source is a titanium alkoxide, however, a mole ratio of $H_2O:(Ti+Si)$ of at least 1 (more preferably at least 2) is used. The weight ratio of water to combined amount of nitrogen-containing organic base and optional organic solvent should be no greater than 1:1. The water may be added directly as such or, if so desired, together with the other reagents used in the present process or even generated in situ from an appropriate source. For example, the silica source or the titanium source may contain water.

The silica and titania sources and mineralizing agent can be added to the growth medium in any order provided that the titanium-containing zeolite is eventually generated in solid crystalline form upon heating of the resulting precursor mixture. In one preferred embodiment, the nitrogen-containing organic base, the titania source, and silica source are first combined and the resulting initial mixture then treated with hydrogen fluoride and, optionally, water. The water is preferably added after addition of the mineralizing agent. The temperature at which the precursor mixture is formed is not critical, but may be, for example, in the range of from $-20°$ C. to $60°$ C.

The precursor mixture is heated for a time and at a temperature sufficient to effect nucleation and precipitation of solid crystals of the titanium-containing zeolite. Such heating may be performed in any suitable reactor or other vessel. Care should be taken to select a vessel constructed of materials resistant to the fluoride-containing mineralizing agent, especially where the mineralizing agent is hydrogen fluoride. The contents of the reactor may be stirred or otherwise agitated while heating; it is believed that agitation tends to favor the formation of relatively small crystals of titanium-containing zeolite. The addition of "seed" crystals of a titanium-containing zeolite such as TS-1 titanium silicalite to the reaction mixture may also assist in the production of smaller crystallites.

The precursor mixture comprising the silica source, titania source, mineralizing agent, and growth medium in certain embodiments of the invention is in the form of a gel or suspension, but in other embodiments is in the form of a solution. Chemical reaction of the components of the precursor mixture may take place prior to heating such mixture. In one embodiment of the invention, the composition of the precursor mixture is as follows: a $SiO_2$:b NOB:c OS:d $TiO_2$:e $F^-$:f$H_2O$ wherein NOB is the nitrogen-containing organic base, OS is the optional organic solvent, the ratio of e:(a+d) is preferably from 0.5:1 to 5:1, the ratio of (b+c):(a+d) is preferably from 5:1 to 100:1, the weight ratio of OS to NOB is preferably from 0:1 to 10:1, the ratio of a:d is preferably from 4:1 to 50:1, a, b, d, and e are each greater than zero, and the ratio of f:(a+d) is preferably from 0:1 to 10:1.

The temperature to which the precursor mixture is subjected may vary depending upon the specific reagents used, but typically, temperatures of from $50°$ C. to $250°$ C. will be suitable. More preferably, the temperature is from $100°$ C. to $200°$ C. Crystallization times will also vary. Although under some conditions heating for up to 2 months or longer may be needed to optimize the yield and crystallinity of the product obtained, under other conditions only 12 to 48 hours will be required.

The process described herein is capable of furnishing large, well-formed zeolite crystals suitable for crystallographic study. Additionally, large single zeolite crystals of well-defined habit are recognized as useful for the development of novel optical, electronic and magnetic materials. The production of small crystallites, which is preferred where the titanium-containing zeolite is to be utilized as a catalyst, is also possible using the process of this invention, however.

Once crystals are formed, they may be recovered by any conventional method for separating solids from a liquid medium such as filtration, decantation, centrifugation, and the like. The as-synthesized titanium-containing zeolite thereby recovered may then be washed with an appropriate liquid such as water and/or an organic solvent, dried, and/or calcined at an elevated temperature (e.g., $300°$ C. to $700°$ C.) to remove any residual organics such as traces of the nitrogen-containing organic base or optional organic solvent. Any remaining fluoride anion can be removed, if so desired, by washing with dilute aqueous acid or the like and recalcining.

EXAMPLES

Example 1

To a 250 mL plastic beaker in a nitrogen-filled glove bag was charged 42.7 g (0.431 mol) hexamethyleneimine, 9.97 g (0.108 mol) n-propylamine, 8.42 g (0.040 mol) tetraethylorthosilicate, and 0.363 g (0.0011 mol) titanium tetra-n-butoxide. The resulting clear solution was stirred for one hour. After this time, 2.02 g pyridine-hydrogen fluoride solution (70% HF) was added dropwise. A slight precipitate formed; the suspension was stirred another 3 hours at room temperature. The beaker was then removed from the dry bag and 3.5 g deionized water added dropwise. The suspension almost immediately gelled to a thick paste. The mixture was stirred by hand while adding aliquots of water. After addition of water was completed, the viscosity of the mixture had decreased such that it could be stirred on a stir plate. After stirring for 1 hour and without further aging, the white suspension was loaded into a series of Teflon-lined Parr reactors and placed in a convection oven at $150°$ C. The molar composition of the precursor mixture was $SiO_2$:10.8 HMI:2.7 n-$PrHN_2$:0.027$TiO_2$:1.8HF:4.9 $H_2O$ where HMI is hexamethyleneimine and n-$PrNH_2$ is n-propylamine.

After 90 days at $150°$ C., the colorless solids obtained were washed thoroughly with water and acetone and then dried at $120°$ C. overnight. XRD analysis of the as-synthesized material yielded a spectrum identical to that of TS-1 titanium silicalite prepared by conventional aqueous hydrothermal methods. There was no indication that other crystalline phases were present. The elemental composition of the as-synthesized product by analysis was 43% Si, 0.79% Ti, <100 ppm Al, and <5 ppm F (Si/Ti molar ratio=93). A weight loss of 16.1% by $600°$ C. was observed by thermogravimetric analysis. A DR-UV spectrum of the as-synthesized product exhibited an intense peak at 230 nm with secondary peaks at 250 and 330 nm. By scanning electron microscopy, the as-synthesized product was found to be in the form of hexagonal prisms with an average crystallite size of about 100 microns; no separate phases could be seen. $^{13}C$ MAS-NMR indicated that hexamethyleneimine and n-propylamine were present in the as-synthesized product together with a small amount (<5%) of an unidentified aliphatic organic material.

The as-synthesized product was calcined at $500°$ C. to yield TS-1 titanium silicalite; no loss of crystallinity occurred during calcination, as evidenced by XRD analysis. The calcined titanium silicalite exhibited a single, broadened peak centered at about 240 nm by DR-UV spectroscopy.

The calcined titanium silicalite was found to be an active catalyst for the epoxidation of 1-hexene using hydrogen peroxide. After 2 hours at 60° C. in methanol solvent, 30% $H_2O_2$ conversion was obtained with 25% selectivity to epoxide and 20% selectivity to glycol ethers.

Example 2

To a solution of 131 g (1.32 mol) hexamethyleneimine was added 22.2 g (0.107 mol) tetraethylorthosilicate and 1.37 g (0.0040 mol) titanium tetra-n-butoxide. The resulting clear yellow solution was stirred for 30 minutes at room temperature and then cooled to 0° C. in an ice bath. A 13.4 g portion of 48% aqueous hydrogen fluoride (0.34 mol HF) was added dropwise over a period of 60 minutes to yield a milky mixture. Deionized water (14.7 g; total of 1.2 mol water) was added dropwise and the thin, cloudy mixture stirred an additional hour at room temperature before seeding with 1.6 g of as-synthesized TS-1 titanium silicalite crystals prepared in accordance with U.S. Pat. No. 4,410,501. The resulting mixture was loaded into "Teflon"-lined Parr reactors and placed in a 150° C. oven (either static or rotating at 50 rpm). After seven days, the white solids formed were isolated by filtration, washed well with water and acetone, and dried at 120° C. The solids were found to have an MFI structure by x-ray diffraction, with no other crystalline phases being present.

Example 3

To a solution of 44 g (0.443 mol) of hexamethyleneimine was added 7.62 g (0.037 mol) tetraethylorthosilicate and 1.92 g (0.0056 mol) titanium tetra-n-butoxide. The resulting clear yellow solution was stirred 30 minutes at room temperature, then cooled to 0° C. A 3.0 g portion of a 70% solution of HF in hexamethyleneimine (0.11 mol HF) was added dropwise over 40 minutes. The ice bath was then removed and the clear yellow solution permitted to warm to room temperature. After two hours of stirring at room temperature, 4.78 g (0.27 mol) deionized water was added dropwise. A thick white precipitate was formed upon addition of the first few drops of water which eventually dissolved after further addition of water. After water addition was completed, a slightly yellow translucent solution was obtained. The precursor mixture composition at this point was:

$SiO_2.12$ hexamethyleneimine.0.15 $TiO_2.3.0$ HF.7.3 $H_2O$

After stirring for another hour at room temperature, 1 g of as-synthesized TS-1 titanium silicalite (prepared in accordance with U.S. Pat. No. 4,410,501) was blended into the precursor mixture. After stirring for another hour, the precursor mixture was loaded into "Teflon"-lined Parr reactors and placed in an oven at 150° C. (static). After 4 days, white crystalline solids (3.1 g) were isolated by filtering, washing well with water and then acetone and drying at 120° C. Powder XRD analysis of the white solids indicated the solids had a crystalline MFI structure. When heated above 150° C., a 9.1% weight loss was observed by thermogravimetric analysis. Calcination of the as-synthesized material at 500° C. completely removed all organic material with no loss of crystallinity.

Elemental analysis of the calcined solids gave 1.1 wt. % Ti, 0.4 wt. % F, and 42 wt. % Si. Hexane adsorption at 90° C. and 50 torr was 10.6% by weight, indicating that the calcined solids had a porosity equivalent to conventionally prepared TS-1 titanium silicalite. Analysis by scanning electron microscopy (SEM) showed that the calcined solids were smooth hexagonal prisms of about 0.5×0.2×0.2 micron average size.

The calcined solids exhibited little activity as an epoxidation catalyst under conditions comparable to those described in U.S. Pat. No. 5,262,590. However, washing the calcined solids with dilute nitric acid at room temperature overnight followed by calcination provided an active and selective olefin epoxidation catalyst. The activity of TS-1 titanium silicalite prepared in this manner was approximately half that of TS-1 titanium silicalite prepared in accordance with U.S. Pat. No. 4,410,501.

Example 4

To 43.7 g (0.44 mol) hexamethyleneimine was added 10.0 g of an isopropyl alcohol solution containing a precondensed copolymer of silicon and titanium alkoxides having a Si/Ti ratio equal to 14.3 (obtained from UCT Corporation). The resulting clear solution was stirred 30 minutes at room temperature, then cooled to 0° C. using an ice bath. To the solution was then added dropwise 3.0 g (0.11 mol HF) of a 70% solution of HF in hexamethyleneimine over a one hour period. After addition was completed, the mixture solidified to a clear, colorless transparent gel. The gel was loosened somewhat by adding 1.0 deionized water and stirring manually in a vigorous manner. Tetrapropyl ammonium bromide (4.52 g; 00.17 mol) in deionized water (4.7 g; 0.21 mol total) was then added with vigorous manual stirring. The mixture thinned and became milky colored. The precursor mixture composition at this point was:

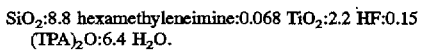

$SiO_2:8.8$ hexamethyleneimine:0.068 $TiO_2:2.2$ HF:0.15 $(TPA)_2O:6.4$ $H_2O$.

After stirring for another hour at room temperature, the mixture was loaded into "Teflon"-lined Parr reactors (no TS-1 titanium silicalite seed crystals were added) and placed in an oven at 150°, either static or rotating at 50 rpm. After 4 days, the white solids which had formed were collected by filtration, washed well with water and acetone, and dried at 120° C. Powder XRD analysis indicated the product had a crystalline MFI structure with no other phases apparent. Thermogravimetric analysis of the as-synthesized material exhibited 14% weight loss above 150° C.

Example 5

To 30.0 g hexamethyleneimine was added 2.2 g (0.037 mol) "Aerosil 200" silica. After all the silica had been added, the mixture became quite thick and required manual stirring. To this mixture was then added a solution of 1.97 g (0.0058 mol) titanium tetrabutoxide dissolved in 13.0 g (0.44 mol total) hexamethyleneimine. The mixture thinned and turned a transparent yellow color. No evidence of any precipitate was observed. After cooling the solution to 0° C. in an ice bath, 3.0 g (0.11 mol HF) of a 70% solution of HF in hexamethyleneimine was added dropwise over the course of one hour. After addition was completed, the mixture remained a yellow transparent color with no evidence of any precipitate; stirring was continued for another hour at room temperature. To this solution was then added a solution of 4.5 g (0.017 mol) tetrapropylammonium bromide in 4.8 g (0.27 mol) deionized water. The solution remained transparent with no visible precipitate. The precursor mixture composition at this point was:

$SiO_2$:12 hexamethyleneimine:0.16$TiO_2$:3.1 HF:1.1 $(TPA)_2O$:5.4 $H_2O$.

After stirring for another hour, 0.06 g of as-synthesized TS-1 titanium silicalite (prepared in accordance with U.S. Pat. No. 4,410,501) was added to the mixture. The precursor mixture was then loaded into "Teflon"-lined Parr reactors and placed in 150° C. ovens, either static or rotating at 50 rpm. After 5 days, the white solid product formed was collected by filtration, washed well with water and acetone, and dried at 120° C. Powder XRD analysis indicated the product had a crystalline MFI structure. Thermogravimetric analysis of the as-synthesized product showed a 14% weight loss above 150° C. Calcination of the product at 550° C. was effective in completely removing the organic material from the pores of the zeolite. Elemental analysis of the calcined titanium silicalite found 7.7 weight % Ti and 1.1 weight % F. The DR-UV spectrum of the calcined titanium silicalite exhibited a single, broad peak centered around 250 nm with no evidence of an anatase peak around 340 nm.

We claim:

1. A non-hydrothermal method of making a titanium-containing zeolite comprising:
   (i) preparing a precursor mixture comprised of
      (a) a silica source;
      (b) a titania source; and
      (c) a growth medium comprising a nitrogen-containing organic base, a fluoride-containing mineralizing agent, and, optionally, an organic solvent which does not prevent mineralization of the silica source and the titania source; and
   (ii) heating said precursor mixture for a time and at a temperature sufficient to form as-synthesized titanium-containing zeolite.

2. The method of claim 1 wherein the nitrogen-containing organic base is selected from the group consisting of primary alkylamines, secondary alkylamines, tertiary alkylamines, N-heterocycles, and mixtures thereof.

3. The method of claim 1 wherein the temperature is from 100° C. to 200° C.

4. The method of claim 1 wherein the molar ratio of fluoride to (Ti+Si) is from 0.5 to 5.

5. The method of claim 1 wherein the silica source is a tetraalkylorthosilicate.

6. The method of claim 1 wherein the titania source is a titanium alkoxide.

7. The method of claim 1 wherein the fluoride-containing mineralizing agent is hydrogen fluoride.

8. The method of claim 1 wherein the growth medium additionally comprises water.

9. The method of claim 8 wherein the molar ratio of water to Ti+Si is less than or equal to 10.

10. The method of claim 1 wherein the growth medium is characterized by the absence of a quaternary ammonium salt.

11. A non-hydrothermal method of making titanium silicalite comprising:
    (i) preparing a precursor mixture comprised of
       (a) a tetraalkylorthosilicate;
       (b) a titanium alkoxide;
       (c) a growth medium comprising water, a nitrogen-containing, organic base selected from the group consisting of primary alkylamines, secondary alkylamines, tertiary alkylamines, N-heterocycles and mixtures thereof, hydrogen fluoride, and, optionally, an organic solvent which does not inhibit mineralization of the tetraalkylorthosilicate and titanium alkoxide wherein such growth medium is characterized by the absence of a quaternary ammonium salt; and
    (ii) heating said precursor mixture at a temperature of from 100° C. to 200° C. for a time effective to form as-synthesized titanium silicalite.

12. The method of claim 11 wherein the tetraalkyl orthosilicate is tetraethylorthosilicate.

13. The method of claim 11 wherein the titanium alkoxide is titanium tetra- n-butoxide.

14. The method of claim 11 wherein said precursor mixture is prepared by first combining the nitrogen-containing organic base, tetraalkylorthosilicate, and titanium alkoxide to form an initial mixture and then combining hydrogen fluoride and, optionally, water with said initial mixture.

15. The method of claim 11 comprising the additional step of calcining the as-synthesized titanium silicalite.

16. The method of claim 11 wherein the nitrogen-containing organic base is a N-heterocycle.

17. The method of claim 16 wherein the N-heterocycle is hexamethyleneimine.

18. The method of claim 11 comprising the additional step of washing the as-synthesized titanium silicalite with dilute aqueous acid.

19. The method of claim 11 wherein the growth medium contains water in an amount such that the molar ratio of water to Ti+Si is from 1:1 to 10:1.

20. The method of claim 11 wherein the molar ratio of fluoride to Ti+Si in is in the range of 0.5 to 5.

21. The method of claim 11 wherein the molar ratio of Si to Ti is in the range of from 4:1 to 50:1.

22. The method of claim 11 wherein the precursor mixture is seeded with crystals of titanium silicalite.

* * * * *